(12) United States Patent
Zamyatin et al.

(10) Patent No.: US 8,385,620 B2
(45) Date of Patent: Feb. 26, 2013

(54) METHOD AND SYSTEM FOR MULTI-DETECTOR-ROW COMPUTED TOMOGRAPHY UTILIZING PROJECTION DATA UP-SAMPLING WITH SHIFT

(75) Inventors: Aleksandr Zamyatin, Buffalo Grove, IL (US); Michael D. Silver, Northbrook, IL (US); Satoru Nakanishi, Tochigi-ken (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 749 days.

(21) Appl. No.: 12/262,283

(22) Filed: Oct. 31, 2008

(65) Prior Publication Data

US 2009/0116721 A1    May 7, 2009

Related U.S. Application Data

(60) Provisional application No. 60/985,115, filed on Nov. 2, 2007.

(51) Int. Cl.
*A61B 6/03*    (2006.01)
(52) U.S. Cl. ............. 382/131; 378/4; 378/210; 378/901
(58) Field of Classification Search ............. 378/4, 210, 378/901; 382/128–132
See application file for complete search history.

(56) References Cited

U.S. PATENT DOCUMENTS

| | | | |
|---|---|---|---|
| 6,272,200 B1* | 8/2001 | Pan et al. | 378/15 |
| 2003/0123603 A1* | 7/2003 | Suzuki | 378/4 |
| 2007/0071159 A1* | 3/2007 | Hsieh et al. | 378/4 |

OTHER PUBLICATIONS

Zamyatin et al., Up-sampling with Shift Method for Windmill Correction, published May 7, 2007, 2006 IEEE Nuclear Science Symposium Record, pp. 2293-2295.*
Smith, IEEE San Diego 2006 Conference Program, Oct. 2006, pp. 1-7 and 114-115.*
La Riviere, Fourier- and Spline-based Approaches for Sparse-Data Problems in Medical Tomography, 2000, University of Chicago, Doctoral Dissertation, 223 pages.*
Pan, Optimal noise control in and fast reconstruction of fan-beam computed tomography image, Medical Physics, vol. 26, No. 5, pp. 689-697.*
Blu et al., How a simple shift can significantly improve the performance of linear interpolation, 2002, IEEE, ICIP 2002, pp. III-377 to III-380.*

* cited by examiner

*Primary Examiner* — Toan Ton
*Assistant Examiner* — John Corbett
(74) *Attorney, Agent, or Firm* — Oblon, Spivak, McClelland, Maier & Neustadt, L.L.P.

(57) ABSTRACT

A computed tomography apparatus and method where data is upsampled with shifting to produce upsampled data. The data is shifted up and down in the same amount in the z-direction, and then upsampled through interpolation. An image is reconstructed using the upsampled data. The process is preferably performed column-by-column. An upsampling shift and interpolation kernel size can be adaptive to the data z-gradient.

12 Claims, 6 Drawing Sheets

METHOD AND SYSTEM FOR MULTI-DETECTOR-ROW COMPUTED TOMOGRAPHY UTILIZING PROJECTION DATA UP-SAMPLING WITH SHIFT

BACKGROUND OF THE INVENTION

1. Field of the Invention

The present invention relates to computed tomographic (CT) imaging, and in particular to CT imaging utilizing up-sampling with shift.

2. Discussion of the Background

The main components of a computed tomography (CT) system are an x-ray tube and x-ray detector. The x-ray tube produces x-ray photons directed towards a scanned object or patient. When x-ray photons penetrate through the object or patient they lose intensity (attenuate) and are measured by the x-ray detector, located on the opposite side of the object or patient. The x-ray source and detector are typically attached to a ring-like base, called a gantry. The gantry rotates around the scanned object or patient, allowing collecting data at a multitude of view angles. At each view angle one x-ray projection is collected and transferred through the digital acquisition system (DAS) to the data processor unit and reconstruction unit. Each projection is given as a set of measurements by a two-dimensional detector array of the intensity of the x-rays emanating from the x-ray source. Such data is called "cone beam" data.

In a two-dimensional detector where each detector element is indexed by k, k=1 ... N×M, where N is the number of detector rows, and M is the number of elements per detector row, the intensity of the x-ray photon beam (ray) at the detector element k, attenuated by an object or patient, is given by:

$$I_k = I_k^0 \exp(-\int \mu(x) dx) \quad (1)$$

where:

γ(x) is the attenuation function sought to be reconstructed.

$I_k^0$ is the beam intensity before attenuation by γ(x), as produced by the x-ray tube and after penetrating through the x-ray filter (for example, wedge or bowtie); and ∫μ(x)dx is the line integral of γ(x) along the line l.

Mathematically, γ(x) can be reconstructed given a set of line integrals corresponding to a plurality of lines l. Therefore, measured intensity data needs to be converted into line integrals first:

$$\int \mu(x) dx = \ln(I_k^0) - \ln(I_k) \quad (2)$$

X-ray tomographic reconstruction consists of the main steps of data acquisition, data processing and data reconstruction. In data acquisition, x-ray intensity data is collected at each detector element and each predefined angular view position. This is done within the rotating part of the gantry. Detectors measure incident x-ray flux and convert it into an electric signal. There are two main types of detectors: energy (charge) integrating and photon counting. The electrical signal is transferred from the rotating part of the gantry to the stationary part though the slipring. During this step data may be compressed.

In data processing, the data is converted from x-ray intensity measurements to the signal corresponding to line integrals according to equation (2). Also, various corrections steps may be applied to (1) reduce effects of undesired physical phenomena, such as scatter, x-ray beam hardening, (2) compensate non-uniform response function of each detector element, and (3) reduce noise.

Depending on the algorithm, data reconstruction may contain all or some of the following processing steps Cosine (fan angle, cone angle) weighting (can be ×cos, or 1/cos)

Data differentiation: This can be performed with respect to fan angle, cone angle, projection angle, source trajectory coordinate, vertical detector coordinate, horizontal detector coordinate, or any combination of those.

Data redundancy weighting. Data is multiplied by the weight function W, which may be a function of fan angle, cone angle, projection angle, source trajectory coordinate, vertical detector coordinate, horizontal detector coordinate, or any combination of those.

Convolution (filtering). This step utilizes a convolution kernel. Some algorithms use ramp-based kernel (H(w)=|w|), some use Hilbert-based kernel (h(t)=1/t, h(t)=1/sin(t), H(w)=i sign(w)). Kernels can be adjusted to the fan beam geometry, scaled, modulated, apodised, modified, or any combination of those.

Backprojection. In this step data is projected back in the image domain. Usually, backprojected data is weighted by a distance factor. The distance factor is inversely proportional to the distance L from the x-ray source position to the reconstructed pixel, and can be proportional to 1/L or $1/L^2$. Also, some additional data redundancy weighting can be applied on the pixel-by-pixel basis. Also, usually the backprojection step includes obtaining data values corresponding to the ray through the reconstructed pixel by either data interpolation or data extrapolation. This process can be done in a numerous variety of ways.

The order in which the above steps are applied depends on a specific reconstruction algorithm.

It is possible to translate the table, on which the scanned object or patient lies, during the scan, so that the object or patient is translated through the gantry. In this case x-ray source describes helical trajectory, relative to the scanned object or patient. This is called "helical cone beam" scanning.

Because of the finite detector element size, projection data corresponds to the band-limited (smoothed) version, $\gamma_0(x)$, of the real reconstructed function γ(x). Therefore, at best, $\gamma_0(x)$ can be reconstructed, not γ(x). However, according to the Nyquist criterion, to reconstruct $\gamma_0(x)$ two samples per beam width are needed. Therefore, if the scanned function γ(x) is sufficiently sharp it violates the Nyquist criterion which causes aliasing artifacts. With helical scans insufficient sampling along the z-axis causes an artifact pattern with interleaving dark and light blades (leafs), known as the "windmill artifact" or "helical artifact".

SUMMARY OF THE INVENTION

The present invention is directed to a CT method and apparatus where, in one embodiment, the apparatus includes an x-ray source, an x-ray detector disposed to receive x-rays from the x-ray source, a data collection unit, and a processing unit for performing upsampling with shifting on data collected by the data collection unit to produce upsampled data, and for reconstructing an image using the upsampled data.

In another embodiment, the method includes exposing a subject to x-rays, collecting data, performing upsampling with shift on the data to produce upsampled data, and reconstructing an image of the subject using the upsampled data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
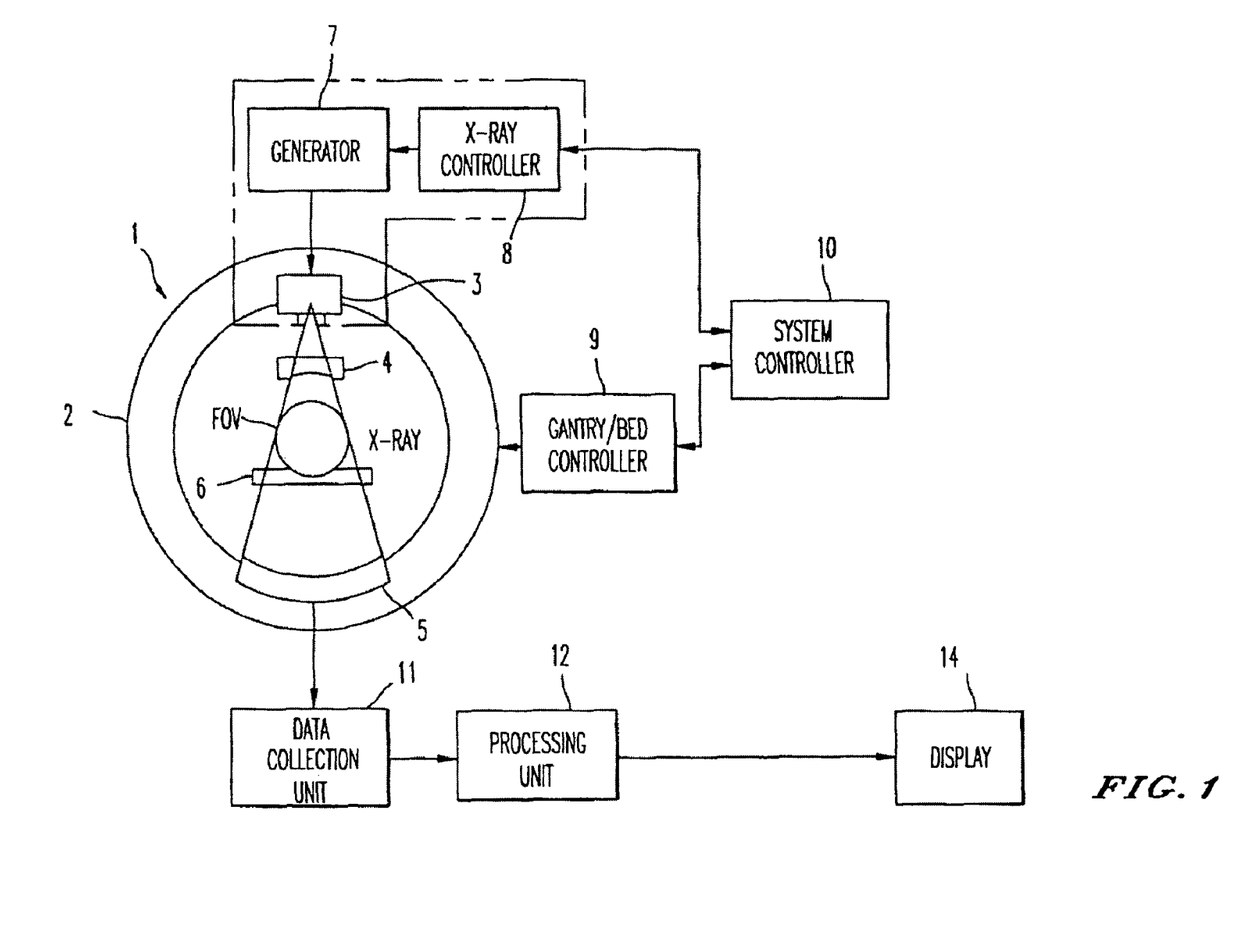
FIG. 1 is a diagram of a system according to the invention.

FIG. 1 shows an x-ray computed topographic imaging device according to the present invention. The projection data measurement system constituted by gantry 1 accommodates an x-ray source 3 that generates a cone-beam of x-ray flux approximately cone-shaped, and a two-dimensional array type x-ray detector 5 consisting of a plurality of detector elements arranged in two-dimensional fashion, i.e., a plurality of elements arranged in one dimension stacked in a plurality of rows. X-ray source 3 and two-dimensional array type x-ray detector 5 are installed on a rotating ring 2 in facing opposite sides of a subject, who is laid on a sliding sheet of a bed 6. Two-dimensional array type x-ray detector 5 is mounted on rotating ring 2. Each detector element will correspond with one channel. X-rays from x-ray source 3 are directed on to subject through an x-ray filter 4. X-rays that have passed through the subject are detected as an electrical signal by two-dimensional array type x-ray detector 5.

X-ray controller 8 supplies a trigger signal to high voltage generator 7. High voltage generator 7 applies high voltage to x-ray source 3 with the timing with which the trigger signal is received. This causes x-rays to be emitted from x-ray source 3. Gantry/bed controller 9 synchronously controls the revolution of rotating ring 2 of gantry 1 and the sliding of the sliding sheet of bed 6. System controller 10 constitutes the control center of the entire system and controls x-ray controller 8 and gantry/bed controller 9 and x-rays are emitted continuously or intermittently at fixed angular intervals from x-ray source 3.

The output signal of two-dimensional array type x-ray detector 5 is amplified by a data collection unit 11 for each channel and converted to a digital signal, to produce projection data. The projection data that is output from data collection unit 11 is fed to processing unit 12. Processing unit 12 performs various processing using the projection data. Unit 12 performs data sampling and shifting (described in more detail below), filtering, backprojection and reconstruction, as well as other desired operation on the projection data. Unit 12 determines backprojection data reflecting the x-ray absorption in each voxel. In the helical scanning system using a cone-beam of x-rays as in the first embodiment, the imaging region (effective field of view) is of cylindrical shape of radius R centered on the axis of revolution. Unit 12 defines a plurality of voxels (three-dimensional pixels) in this imaging region, and finds the backprojection data for each voxel. The three-dimensional image data or tomographic image data compiled by using this backprojection data is sent to display device 14, where it is displayed visually as a three-dimensional image or tomographic image.

Figure 2:
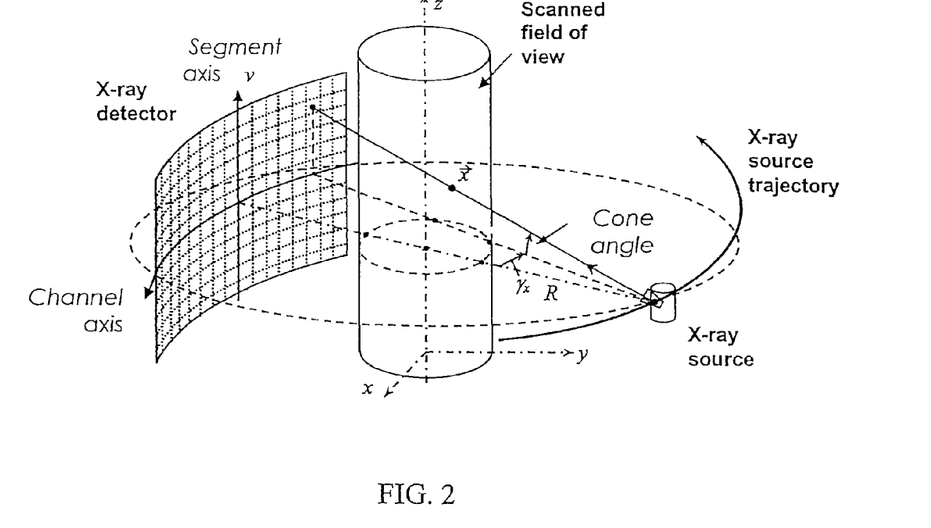
FIG. 2 is a diagram of scanning geometry.

The system geometry for explaining the apparatus and method according to the invention is shown in FIG. 2. X-rays are emitted with a cone angle and a fan angle and pass through an object with a scanned field of view. The source follow a helical trajectory. The rays are detected by the two-dimensional detector.

As described above, "windmill" artifacts are present in CT images. The windmill artifact manifests itself in the form of 2N "windmill" blades, where N is the number of segments (detector rows). The windmill artifact has N dark blades and N light blades, interleaving with each other.

The windmill artifact rotates, making a full revolution over one helical pitch. If two images are combined with the windmill artifacts being "out-of-phase", so that dark blades overlap the light blades, then the windmill artifacts may be cancelled. To obtain this "out-of-phase" cancellation effect, the two images must be reconstructed at the following z-distance from each other:

$$\Delta = \frac{Hp}{2Nseg}$$

where Hp is the couch (table) transition in mm per rotation. The images are then combined in the data domain. One advantage of this approach is that only one backprojection is required per reconstructed image. Another advantage is that data-domain processing provides more flexibility, for example adaptive filtering.

Figure 3:
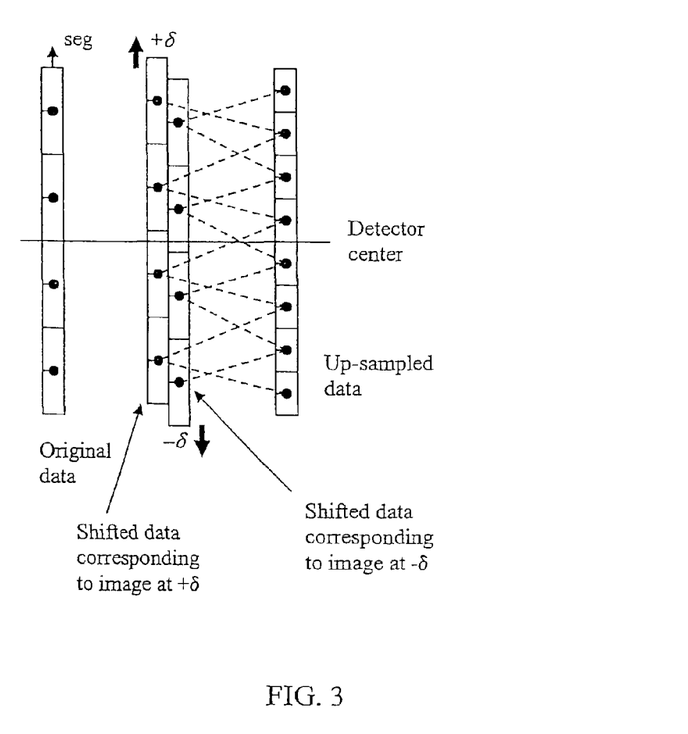
FIG. 3 is a diagram illustrating upsampling with shifting.

FIG. 3 is provided to illustrate how the upsampling is accomplished in the data-domain. Here, an isocenter approximation is used. For each image two virtual images are considered, one at $+\delta$ and another at $-\delta$, where $\delta=\Delta/2$. For each "virtual image" the data is shifted either by $+\delta$ a or $-\delta$ in the z-direction. The original data is shown on the left, and the two "virtual" or shifted images are shown in the center. Up-sampled data is produced by interpolation from two virtual shifted projections, and is shown on the right side of the figure.

The up-sampling is preferably performed in the following fashion. Even segments (starting from 0) are interpolated from the $-\delta$ projection and odd segments are interpolated from the $+\delta$ projection. The process is preferably performed column-by-column. The up-sampling with shift can use the two nearest samples, for example, with 64×0.5 slice data. For other data different interpolation kernels may be used. For example, with 16×1 slice data a wider interpolation kernel is preferred. Up-sampling with shift provides best results near the center, where the distance between two virtual images remains exactly $\Delta$. Away from the center the effect becomes somewhat reduced.

The upsampling shift is calculated by:

$$\delta = \frac{\Delta}{2} = \frac{Hp}{4Nseg}$$

Tables 1 and 2 provide examples of the upsampling shift:

TABLE 1

| | Pitch | | |
|---|---|---|---|
| Detector | 11 mm/rot | 15 mm/rot | 23 mm/rot |
| 16 × 1.0 mm | 0.172 | 0.234 | 0.359 |
| 16 × 0.5 mm | 0.086 | 0.117 | 0.18 |

TABLE 2

| Detector | Pitch | | |
|---|---|---|---|
| | 41 mm/rot | 53 mm/rot | 95 mm/rot |
| 64 × 0.5 mm | 0.08 | 0.104 | 0.186 |

Figure 4:
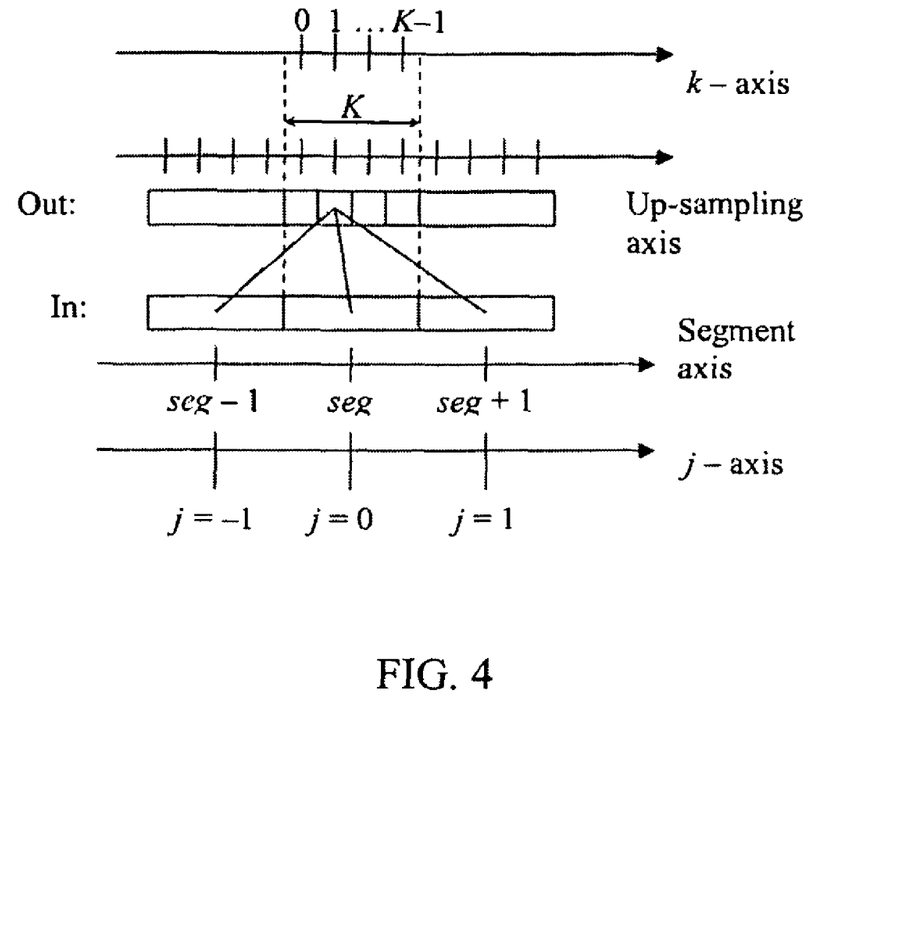
FIG. 4 is a diagram illustrating upsampling with shifting.

The up-sampling is illustrated in FIG. 4 and is preferably performed according to the following equation:

$$Out[seg \cdot K + k] = In[seg-1] \cdot a(-1, k) +$$

$$In[seg] \cdot a(0, k) + In[seg+1] \cdot a(1, k)$$

$$= \sum_{j=-1}^{1} In[seg + j] \cdot a(j, k)$$

where:
a(j, k) is the contribution of each of three input data samples,
"In" is the input data column,
"Out" is the output upsampled data column,
seg is the segment (detector row) index, $0 \leq seg \leq Nseg$, where Nseg is the number of detector rows.
K is the upsampling factor, K=2, 4, . . . ,
k is the local upsampled segment index, $0 \leq k < K$,
Global upsampled segment index is useg=seg·K+k, $0 \leq useg < Nseg \times K$, and
j is the local interpolation segment index, j=−1, 0, 1.

Here, the upsampling occurs directly from the data without performing any calculation for processing to create the virtual images. The virtual images are for understanding how the upsampling works.

Coefficients a(j, k) are found from $$a(j,k)=h(j-s),$$

where h(j−s) is the interpolation kernel defined by $$h(j, L) = \begin{cases} L - |j|, & -L < j < L \\ 0, & \text{otherwise.} \end{cases}$$

Figure 5:
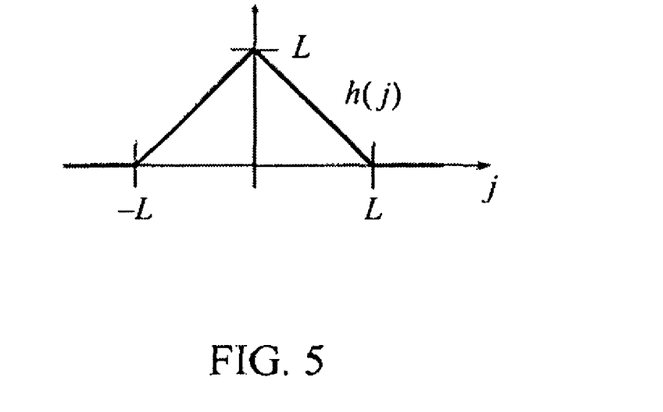
FIG. 5 is a diagram illustrating the upsampling interpolation kernel.
Figure 6:
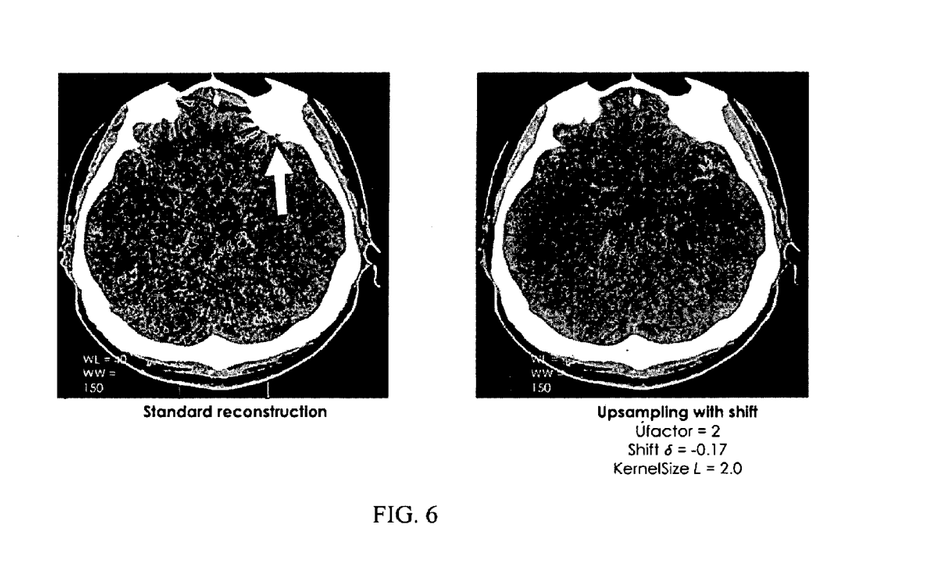
FIGS. 6-10 are images obtained according to the invention compared with conventional images.
Figure 7:
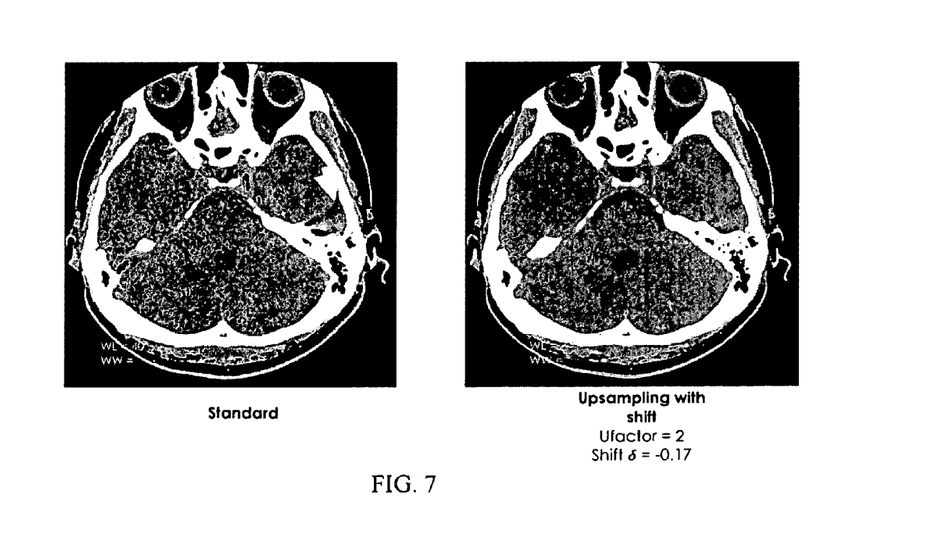
Figure 8:
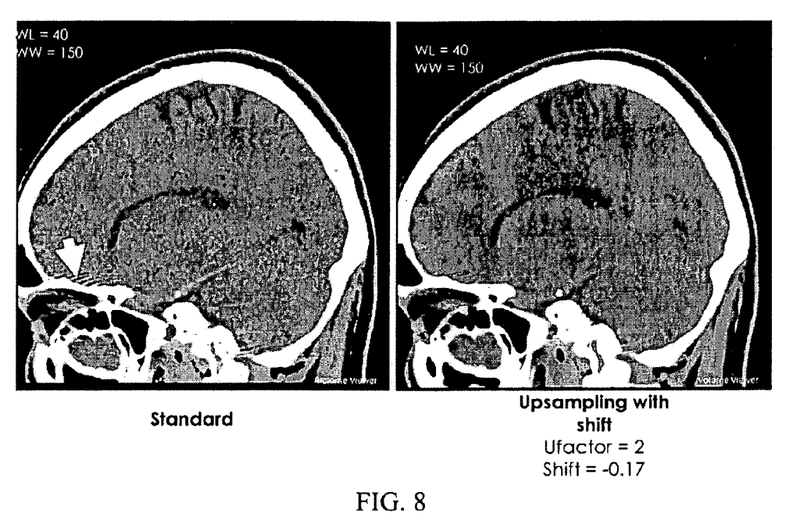
Figure 9:
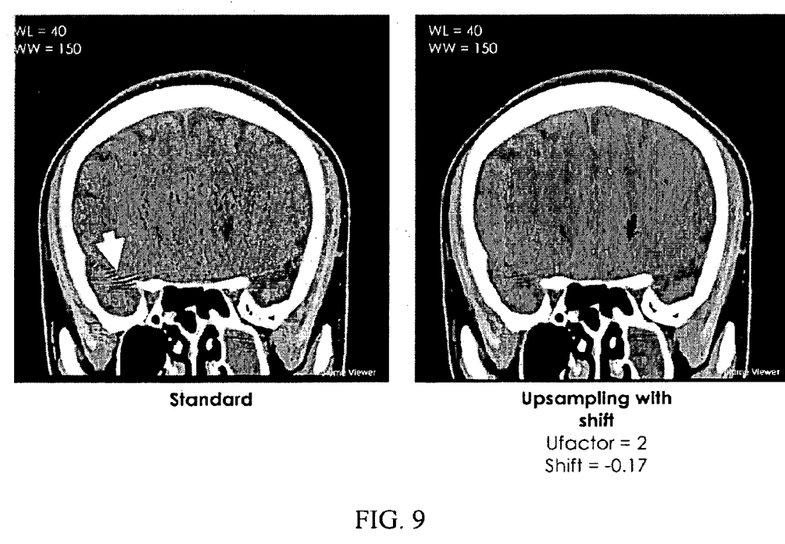

The interpretation kernel is illustrated in FIG. 5. The parameter s is found by:

$$s = \frac{k - \frac{K-1}{2}}{K} = \frac{2k - K + 1}{2K}$$

If some shift $\ddot{v}$ is introduced (as discussed above), then equation for s becomes:

$$s_\delta = s + \delta, \text{ if } k \text{ is even}$$

$$s_\delta = s - \delta, \text{ if } k \text{ is odd}$$

Preferably, the coefficients a(j, k) are normalized so that $$\sum_{j=-1}^{1} a(j, k) = 1$$

for all k.

Even though the interpolation kernel size L is increased, the three nearest input samples are preferably used to interpolate each sample of the up-sampled output data. Also, although the equations are derived for any upsample factor K, in the preferred embodiment K=2, which is faster and easier to implement.

Therefore, upsampling coefficients are given by a 3×2 table.

Example 1

δ=0.172, L=1.0

Then the coefficients a(j, k) are given by:

| 0.422 | 0.578 | 0 |
|---|---|---|
| 0 | 0.578 | 0.422 |

Example 2

δ=0.172, L=2.0

Then the coefficients a(j, k) are given by:

| 0.397 | 0.441 | 0.162 |
|---|---|---|
| 0.162 | 0.441 | 0.397 |

In example 2 the upsampled data is calculated by:

Out[2·seg]=In[seg−1]·0.397+In[seg]·0.441+In[seg+1]·0.162

Out[2·seg+1]=In[seg−1]·0.162+In[seg]·0.441+In[seg+1]·0.397

It is noted that the up-sampling can be used at any point in the data processing and reconstruction, which typically includes, weighting (for example, cosine weighting), taking derivatives, rebinning or resampling to different coordinates, convolving using various filters, such as ramp, Hilbert, etc., applying redundancy weighting, and back-projection, to bring the processed data into the image domain. Preferably, the invention is used after convolving the data and just before back-projection.

In a first modification, the upsampling kernel size L is adaptive to the data z-gradient. First, data gradient ∇z=|data (seg+1, ch)−data(seg−1, ch)| is determined. If gradient ∇z is small (less then some threshold T1), a smaller value of L, for example L=1, can be used. If gradient ∇z is large (greater than some T2), a larger value of L, for example L=2, can be used. If T1<∇z<T2 an intermediate value of L, for example L=1+ (∇z−T1)/(T2−T1), can be used. As an example, we can use T1=$10^8$, T2=$10^9$.

In a second modification, the upsampling shift size δ is adaptive to the data z-gradient. Data gradient ∇z=|data(seg+ 1, ch)−data(seg−1, ch)| is determined. If gradient ∇z is large (greater than some T2), a larger value of δ, for example δ=0.5. Here it is preferred to use $$\delta_0 = \frac{Hp}{4Nseg}.$$

If gradient ∇z is small (less than some threshold T1), a smaller value of δ, for example δ=0.1 or δ=δ₀/2, can be used. If T1<∇z<T2 an intermediate value of δ can be used. Again, T1=10⁸, T2=10⁹.

Images prepared using the apparatus and method according to the invention are shown in FIGS. 6-10. The figures show CT scans of the head. In FIGS. 6-9 scan conditions are:
120 KV, 200 mA (300 mAs)
16×1.0 mm detector
1800 views per revolution
Helical pitch 11 mm/rot
The reconstruction parameters are:
Reconstruction FOV=180 mm, image matrix is 512×512.
Reconstruction image pitch is 0.35 mm The windmill artifact is shown by the arrow. These figures results show that windmill artifact reduction is strong, but there is some blurriness. The first and second modifications described above have strong windmill artifact reduction and reduce the blurriness.

Figure 10:
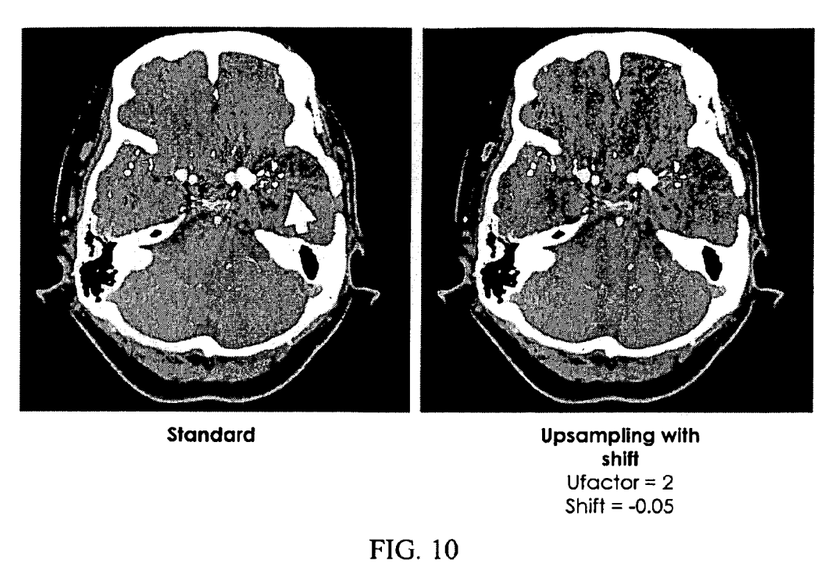

In FIG. 10 scan conditions are:
64×0.5 mm detector
900 views per revolution
Helical pitch 20.5 mm/rot
The reconstruction parameters are:
Reconstruction FOV=180 mm, image matrix is 512×512.
Reconstruction image pitch is 0.35 mm The windmill artifact is shown by the arrow. Even though with the 64×0.5 mm detector the windmill artifact is not very strong, the proposed method provides considerable image quality improvement. Also, no blurriness is observed in this case, so using two modifications described above for adaptive upsampling is not always necessary.

The present invention may be implemented in software or in hardware. In particular the operation of the processing unit described above can be carried out as a software program run on a microprocessor or a computer. The software can be stored on a computer-readable medium and loaded into the system.

Numerous other modifications and variations of the present invention are possible in light of the above teachings. It is therefore to be understood that within the scope of the appended claims, the invention may be practiced otherwise than as specifically described herein.

The invention claimed is:

1. A computed-tomography apparatus, comprising:
an x-ray source;
an x-ray detector disposed to receive x-rays from said x-ray source;
a data collection unit; and
a processing unit for performing upsampling with shifting on data collected by said data collection unit to produce upsampled data, and for reconstructing an image using said upsampled data, wherein said processing unit is configured to perform said upsampling using:

$$\text{Out}[seg \cdot K + k] = \text{In}[seg - 1] \cdot a(-1, k) +$$
$$\text{In}[seg] \cdot a(0, k) + \text{In}[seg + 1] \cdot a(1, k)$$
$$= \sum_{j=-1}^{1} \text{In}[seg + j] \cdot a(j, k)$$

where:
a(j, k) is the contribution of each of three input data samples,
"In" is an input data column,
"Out" is an output upsampled data column,
seg is a segment (detector row) index, $0 \leq seg \leq Nseg$, where Nseg is a number of detector rows in said detector,
K is an upsampling factor, K=2, 4, . . . ,
k is an local upsampled segment index, $0 \leq k \leq K$, and
j is a local interpolation segment index, j=−1, 0, 1.

2. The apparatus as recited in claim 1, wherein a(j, k) is a weight coefficient and said weights are determined as $$a(j,k)=h(j-s),$$

where h(j−s) is a interpolation kernel defined by $$h(j, L) = \begin{cases} L - |j|, & -L < j < L \\ 0, & \text{otherwise.} \end{cases}$$

and parameter s is found by:

$$s = \frac{k - \frac{K-1}{2}}{K} = \frac{2k - K + 1}{2K}.$$

3. A computed tomography method, comprising:
exposing a subject to x-rays;
collecting data;
performing upsampling with shift on said data to produce upsampled data; and
reconstructing an image of said subject using said upsampled data, wherein said upsampling with shift comprises:

$$\text{Out}[seg \cdot K + k] = \text{In}[seg - 1] \cdot a(-1, k) +$$
$$\text{In}[seg] \cdot a(0, k) + \text{In}[seg + 1] \cdot a(1, k)$$
$$= \sum_{j=-1}^{1} \text{In}[seg + j] \cdot a(j, k)$$

where:
a(j, k) is the contribution of each of three input data samples,
"In" is an input data column,
"Out" is an output upsampled data column,
seg is a segment (detector row) index, $0 \leq seg \leq Nseg$, where Nseg is a number of detector rows in said detector,
K is an upsampling factor, K=2, 4, . . . ,
k is an local upsampled segment index, $0 \leq k \leq K$, and
j is a local interpolation segment index, j=−1, 0, 1.

4. The method as recited in claim 3, wherein a(j,k) is a weight coefficient and said weights are determined as $$a(j,k)=h(j-s),$$

where h(j−s) is a interpolation kernel defined by $$h(j, L) = \begin{cases} L - |j|, & -L < j < L \\ 0, & \text{otherwise,} \end{cases}$$

and parameter s is found by:

$$s = \frac{k - \frac{K-1}{2}}{K} = \frac{2k - K + 1}{2K}.$$

5. A computed tomography method, comprising:
exposing a subject to x-rays;
collecting data;
performing upsampling with shift on said data to produce upsampled data; and
reconstructing an image of said subject using said upsampled data, wherein said upsampling increases a number of detector rows by 1.

6. A computed tomography method, comprising:
exposing a subject to x-rays;
collecting data;
performing upsampling with shift on said data to produce upsampled data; and
reconstructing an image of said subject using said upsampled data, the method further comprising:
using an interpolation kernel in said upsampling; and
adaptively changing a size of said kernel.

7. A computed tomography method, comprising:
exposing a subject to x-rays;
collecting data;
performing upsampling with shift on said data to produce upsampled data; and
reconstructing an image of said subject using said upsampled data, the method further comprising:
varying a shift amount used in said upsampling.

8. A non-transitory computer-readable medium that stores instructions that when executed by a computer, cause the computer to perform a method comprising:
exposing a subject to x-rays;
collecting data;
performing upsampling with shift on said data to produce upsampled data; and
reconstructing an image of said subject using said upsampled data, wherein said upsampling with shift comprises:

$$\mathrm{Out}[seg \cdot K + k] = \mathrm{In}[seg - 1] \cdot a(-1, k) +$$
$$\mathrm{In}[seg] \cdot a(0, k) + \mathrm{In}[seg + 1] \cdot a(1, k)$$
$$= \sum_{j=-1}^{1} \mathrm{In}[seg + j] \cdot a(j, k)$$

where:
a(j, k) is the contribution of each of three input data samples,
"In" is an input data column,
"Out" is an output upsampled data column,
seg is a segment (detector row) index, $0 \leq seg \leq Nseg$, where Nseg is a number of detector rows in said detector,
K is an upsampling factor, K=2, 4, . . . ,
k is an local upsampled segment index, $0 \leq k \leq K$, and
j is a local interpolation segment index, j=−1, 0, 1.

9. The medium as recited in claim 8, wherein a(j, k) is a weight coefficient and said weights are determined as a(j,k)=h(j−s), where h(j−s) is a interpolation kernel defined by $$h(j, L) = \begin{cases} L - |j|, & -L < j < L \\ 0, & \text{otherwise,} \end{cases}$$

and parameter s is found by:

$$s = \frac{k - \frac{K-1}{2}}{K} = \frac{2k - K + 1}{2K}.$$

10. A non-transitory computer-readable medium that stores instructions that when executed by a computer, cause the computer to perform a method comprising:
exposing a subject to x-rays;
collecting data;
performing upsampling with shift on said data to produce upsampled data; and
reconstructing an image of said subject using said upsampled data, wherein said upsampling increases a number of detector rows by 1.

11. A non-transitory computer-readable medium that stores instructions that when executed by a computer, cause the computer to perform a method comprising:
exposing a subject to x-rays;
collecting data;
performing upsampling with shift on said data to produce upsampled data and
reconstructing an image of said subject using said upsampled data, wherein said method further comprises:
using an interpolation kernel in said upsampling; and
adaptively changing a size of said kernel.

12. A non-transitory computer-readable medium that stores instructions that when executed by a computer, cause the computer to perform a method comprising:
exposing a subject to x-rays;
collecting data;
performing upsampling with shift on said data to produce upsampled data; and
reconstructing an image of said subject using said upsampled data, wherein said method further comprises:
varying a shift amount used in said upsampling.

* * * * *